No. 720,554. PATENTED FEB. 17, 1903.
C. BENESH.
COMBINED WRENCH AND THREAD CUTTER.
APPLICATION FILED FEB. 17, 1902.
NO MODEL.
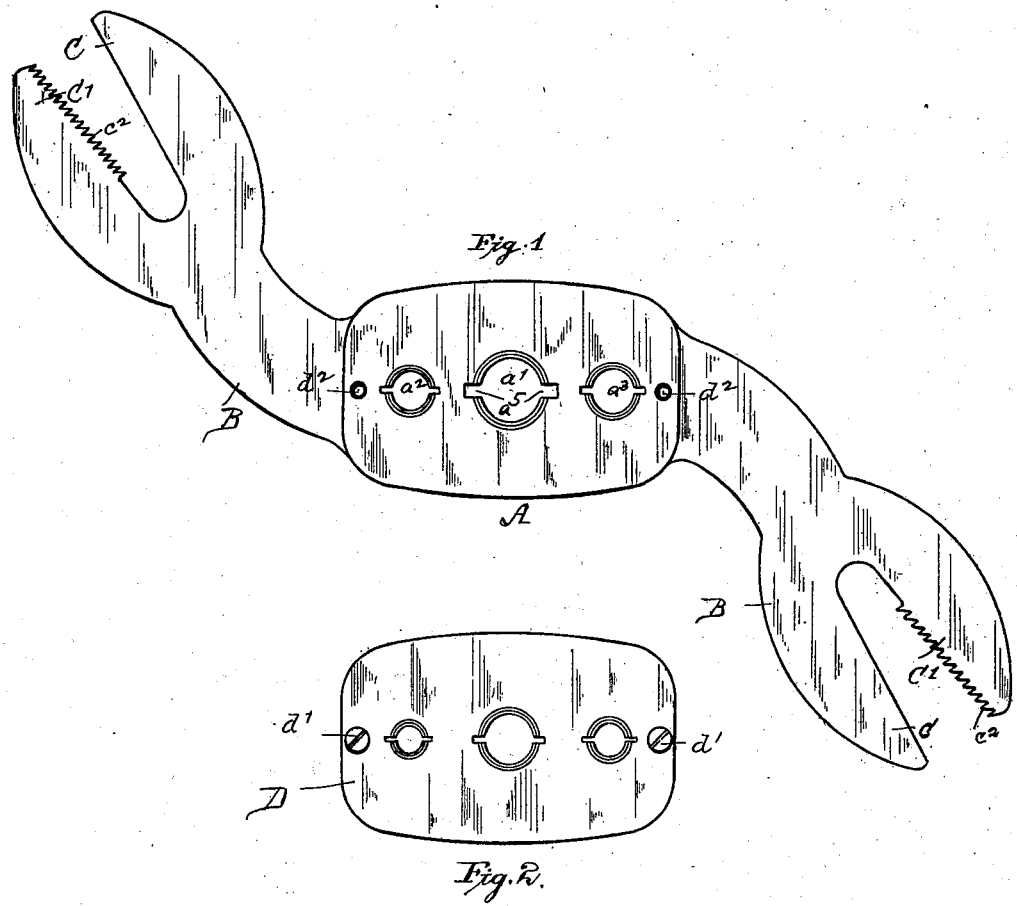
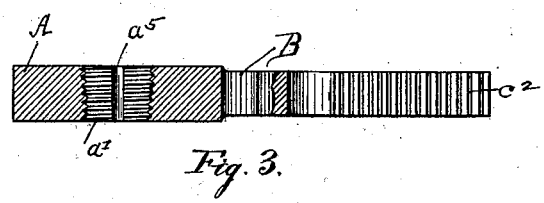

UNITED STATES PATENT OFFICE.

CHARLES BENESH, OF WAHPETON, NORTH DAKOTA.

COMBINED WRENCH AND THREAD-CUTTER.

SPECIFICATION forming part of Letters Patent No. 720,554, dated February 17, 1903.

Application filed February 17, 1902. Serial No. 94,378. (No model.)

*To all whom it may concern:*

Be it known that I, CHARLES BENESH, a citizen of the United States, residing at Wahpeton, in the county of Richland and State of North Dakota, have invented certain new and useful Improvements in a Combined Wrench and Thread-Cutter; and I do hereby declare the following to be a full, clear, and exact description of the invention, such as will enable others skilled in the art to which it appertains to make and use the same.

My invention relates to an improved tool which combines the functions or qualities of a pipe and nut wrench and a thread cutter or dresser for bolts, rods, and the like.

The object of my invention is to provide a tool of the character referred to which can be cheaply manufactured and will be specially useful for farmers and mechanics, who cannot, as a rule, afford to have a tool for each purpose.

A special object is to provide a tool that will remove nuts from machine-bolts and if the bolt-threads become damaged to dress them so that the nuts may be readily replaced.

Having the aforegoing objects in view, and others of general utility, I have designed the tool shown in the accompanying drawings, which form a part of this application, and in which—

Figure 1 is a plan view of my improved tool. Fig. 2 is a plan view of a separate die for use with my improved tool, and Fig. 3 is a cross-section through the middle of the tool and showing one of the jaws broken away.

Referring to the drawings in detail, A represents the central or die portion of my improved tool, from which extend angularly-curved arms B B, which terminate in spaced jaws C C', the former plain and the latter formed with transverse teeth $c^2$. The portions described are formed integrally and preferably made from a drop-steel forging, with the central or die portion suitably hardened by any well-known process.

Extending through the die portion of the tool are three sockets $a'$, $a^2$, and $a^3$, of different diameters, each of which is provided with thread-cutting faces and with grooves $a^5$ to permit the chips to fall out. The sides of these sockets are preferably slightly beveled, though they may of course be parallel, if desired. The smallest diameters of these sockets are made to standard gage, so as to accommodate bolts of standard diameters, the ends of which are inserted in the sockets and the shank of the bolts secured in a vise, whereupon the tool is turned and acts as a thread-cutter, the jaws serving as handles by which to turn the tool.

Instead of forming die-sockets directly in the tool, I may provide plain holes therein and attach to the die portion separate die-plates D, as shown. These plates are provided near their ends with screws $d'$, which are adapted to enter threaded holes $d^2$ in the die portion of the tool.

To adapt the tool for cutting threads on bolts of six different diameters, I may provide die-sockets directly in the tool, as shown in Fig. 1, the several diameters of which will be, respectively, greater than the diameters of the die-sockets in the separable plate D, so that when the latter is applied to the tool or die portion A the sockets in the latter will not interfere with the operation of the die-plate.

The jaws C C' are preferably made flaring, as shown, and teeth formed only on one jaw, so that they may grip either nuts, rods, or pipes with equal effectiveness. Such formation is, however, not essential to the usefulness or operation of the tool, and I do not wish to be limited to such construction.

Having thus described my invention, what I claim, and desire to secure by Letters Patent, is—

1. In a tool of the class described, a bar having die-sockets of different diameters formed therein, and a plate detachably secured to said bar, said plate having die-sockets therein which register with the sockets in the bar, but are of smaller relative diameters.

2. In a tool of the class described, a bar having handles at each end, and intermediate said handles having formed therein a series of die-sockets of different diameters, and a plate detachably secured to said bar and positioned between said handles, said plate having formed therein a series of die-sockets of different diameters which register with the die-sockets in the bar, and are respectively of smaller relative diameters than the bar-sockets, substantially as set forth.

In testimony whereof I affix my signature in presence of two witnesses.

CHARLES BENESH.

Witnesses:
ADOLPHE BESSIE,
M. NEWMAN.